United States Patent [19]

Shotwell

[11] Patent Number: 5,278,632

[45] Date of Patent: Jan. 11, 1994

[54] MULTI-AXIS OPTICAL PROJECTOR

[75] Inventor: Vernon H. Shotwell, Franklin, Tenn.

[73] Assignee: Teledyne Industries Inc., Los Angeles, Calif.

[21] Appl. No.: 896,812

[22] Filed: Jun. 11, 1992

[51] Int. Cl.⁵ .......................................... G01B 11/24
[52] U.S. Cl. .................................. 356/376; 356/388; 356/390
[58] Field of Search ............... 356/372, 376, 388, 390, 356/391, 392, 393, 395; 358/106, 107

[56] References Cited

U.S. PATENT DOCUMENTS 2,574,119  11/1951  Mottu ................................. 356/390
5,061,074  10/1991  Ohikata et al. ..................... 356/390

FOREIGN PATENT DOCUMENTS 332017  7/1930  United Kingdom ............... 356/390
674193  6/1952  United Kingdom ............... 356/395

Primary Examiner—F. L. Evans
Attorney, Agent, or Firm—Armstrong, Westerman, Hattori, McLeland & Naughton

[57] ABSTRACT

A multi-axis optical projector comprises an optical yoke having two spaced-apart primary objective lenses and optical paths for transmitting either backlight or front light from light sources to a target object disposed between the primary objective lenses and from the target object to a secondary objective lens focussing on an eyepiece which may be a video camera. The projector is used, for example in a tool presetting or tool measuring system, for viewing of a specimen, such as a cutting tool, to measure tool profile and to identify tool surface defects such as cracks, chips, wear patterns and coating abnormalities.

21 Claims, 4 Drawing Sheets

MULTI-AXIS OPTICAL PROJECTOR

BACKGROUND OF THE INVENTION

This invention relates to a multi-axis optical projector comprising an optical yoke for use, for example in a tool presetting or tool measuring system, for viewing of a specimen, such as a cutting tool, to measure tool profiles and to identify tool surface defects such as cracks, chips, wear patterns and coating abnormalities.

Optical comparators are often used in conjunction with tool presetting apparatus. Such prior art devices permit viewing of a specimen in silhouette (backlighting). When viewing a curved surface, a comparator can be expected to create a "fuzzy" image. This is because of parallax: the specimen usually is illuminated broadly on both sides of the focal point due to the usual low quality (normally plano-convex) lenses employed in a separate, discrete lamp house. The target is flood-lit both before and after the functional focal plane of the objective lens.

The traditional approach to determining edge position and tool size with presetting fixtures has been to make use of electromechanical touch probes or single view optical projectors. The latter method offers the advantage of non-contact dimensional determination for cutting tools such as those composed of polycrystalline diamond or other brittle materials. However, with current optical projectors, only a backlighted image is available for viewing a specimen. The prior art is devoid of optical arrangements employing a microscope or macro-capable telescope with dual, selectable objective lens systems providing for both backlighting and front lighting so that both tool measurement and surface integrity can be determined.

Moreover, current optical projectors used in conjunction with tool presetting applications inherently bias the presetting machine to either a right or left hand tool setting orientation.

SUMMARY OF THE INVENTION

In contrast to prior art optical comparators, the present invention provides means to illuminate a target zone with an intense light source at or near infinite distance, thereby eliminating the fuzziness encountered with use of prior art devices. The object to be viewed is placed between two alternative objective lenses disposed at 180° from each other, and providing for both front and backlighting. This permits, not only profile measurements, but also accurate surface inspection of specimens such as tools for checking for flaws which are difficult or impossible to detect with only a backlighted image. The overall arrangement of lenses, mirrors and prisms in accordance with the invention allows an operator an additional viewing perspective, permits viewing of tools possessing "handedness" (clockwise or counter-clockwise rotation during cutting operations), and, with re-direction of the image path, achieves a non-biased tool-setting orientation.

DETAILED DESCRIPTION OF THE INVENTION

Figure 1:
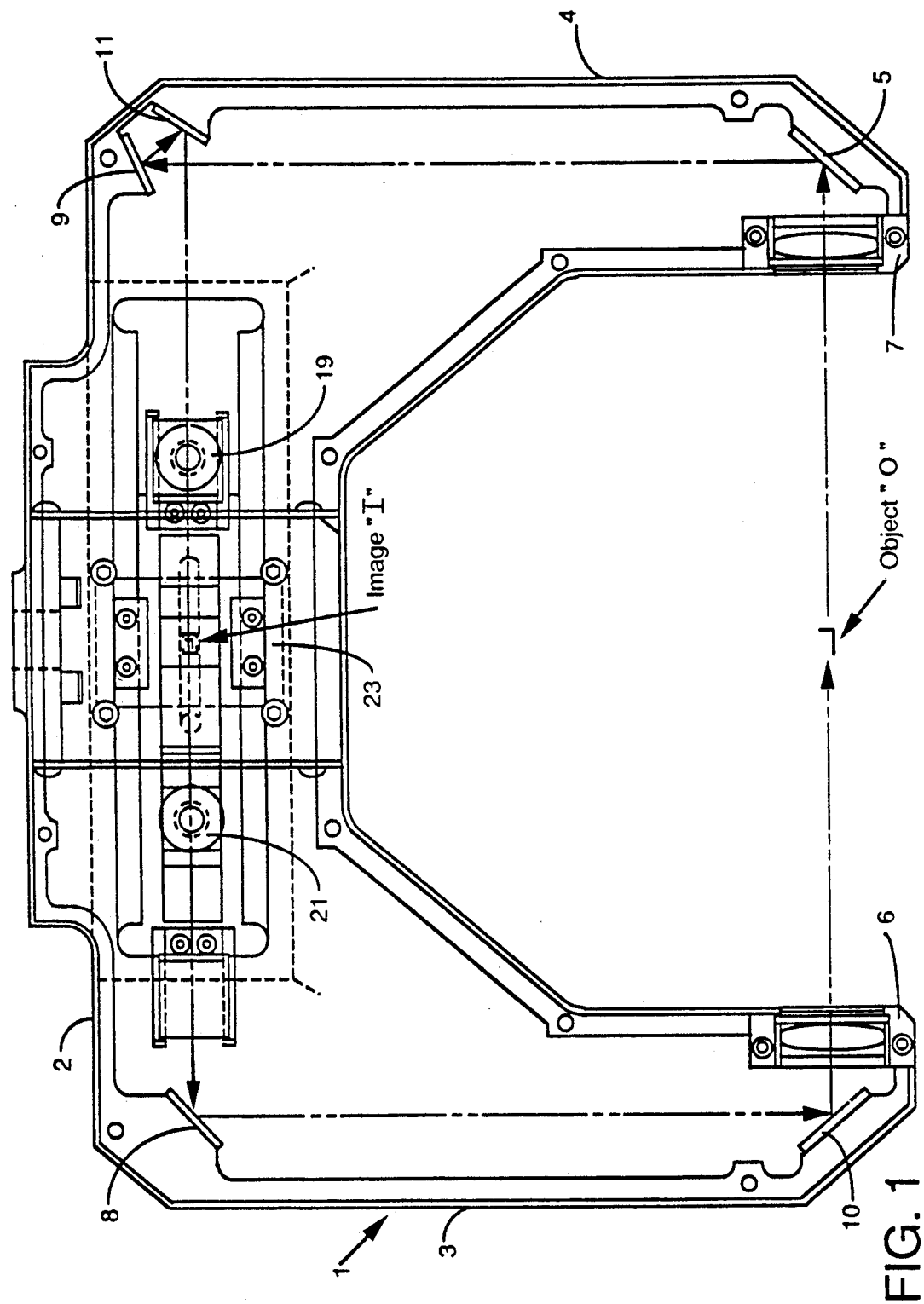
FIG. 1 is a top plan view of an optical yoke in accordance with the present invention in a left hand tool viewing position.

In FIG. 1, the numeral 1 refers generally to an optical yoke comprising a cross-piece 2 and legs 3 and 4. At the free end of the legs 3 and 4 are mounted primary achromatic objective lenses 6 and 7 respectively. These lenses are adjustable, for focussing, and are equidistant from a point "O" representing disposition of a object to be viewed.

A mirror 8 is disposed at the outer corner of the juncture of the cross-piece 2 and the leg 3, and a pair of mirrors 9, 11, functioning in the nature of a prism, are disposed at the outer corner of the junction of the cross-piece 2 and the leg 4. A mirror 5 is disposed at the outer corner of the free end of leg 4 and a mirror 10 is disposed at the outer corner of the free end of leg 3.

Figure 2:
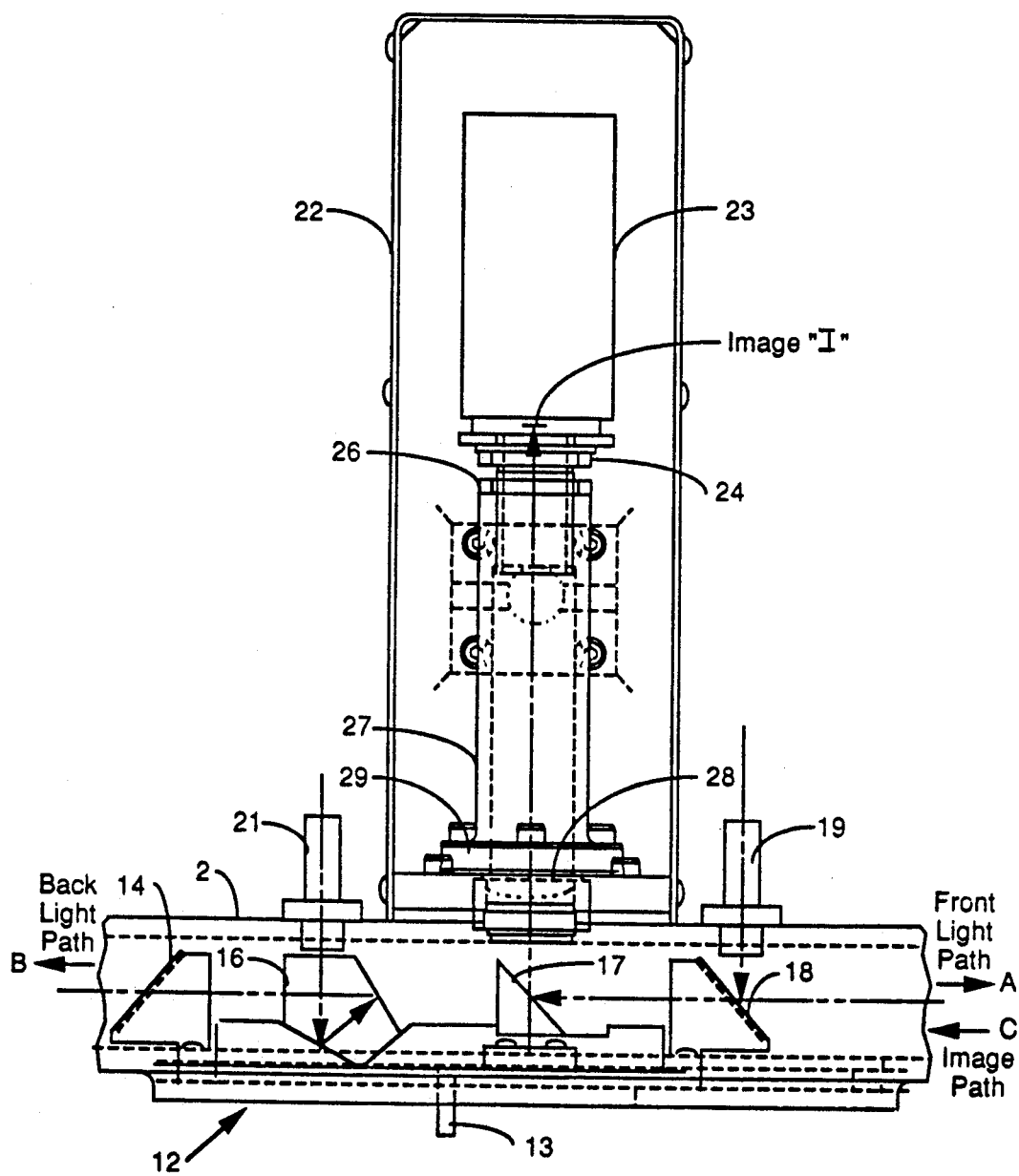
FIG. 2 is a front elevational view of the yoke of FIG. 1.

As more clearly shown in FIG. 2, a number of optical elements are mounted on a selector slide, generally denoted by the numeral 12, which in turn is reciprocally movably mounted on the cross-piece 2. A selector knob 13 is affixed to the slide 12 and serves as a handle for manually moving the slide 12 in a desired direction.

The optical elements mounted on slide 12 comprise a first beam splitter 14, a pentaprism 16, a mirror 17 and a second beam splitter 18.

Also mounted on the yoke cross-piece are a first light source 19 and a second light source 21. Each light source can serve as a source of backlighting or front lighting. For right hand tool viewing, the first light source is selected for front lighting, with the first beam splitter under the light source, and the second light source is selected for backlighting with the slide-mounted mirror under the light source. For left hand tool viewing the second light source is selected for front lighting, with the second beam splitter under the light source, and the first light source is selected for backlighting, with the pentaprism under the light source.

A housing 22 is mounted on cross-piece 2 and accommodates a video camera 23 having an adjustable adaptor 24 for focussing and is attached by a lock ring 26 to a camera tube 27. Mounted within the camera tube 27 is an achromatic secondary or eyepiece lens 28 fixed in a stationary mount 29.

The lens 28 focuses an image "I" on a charge couple device ("CCD") array (not shown) of the video camera 23. In the device as illustrated, the image "I" is inverted and reversed. The image is re-erected by the video camera.

Figure 3:
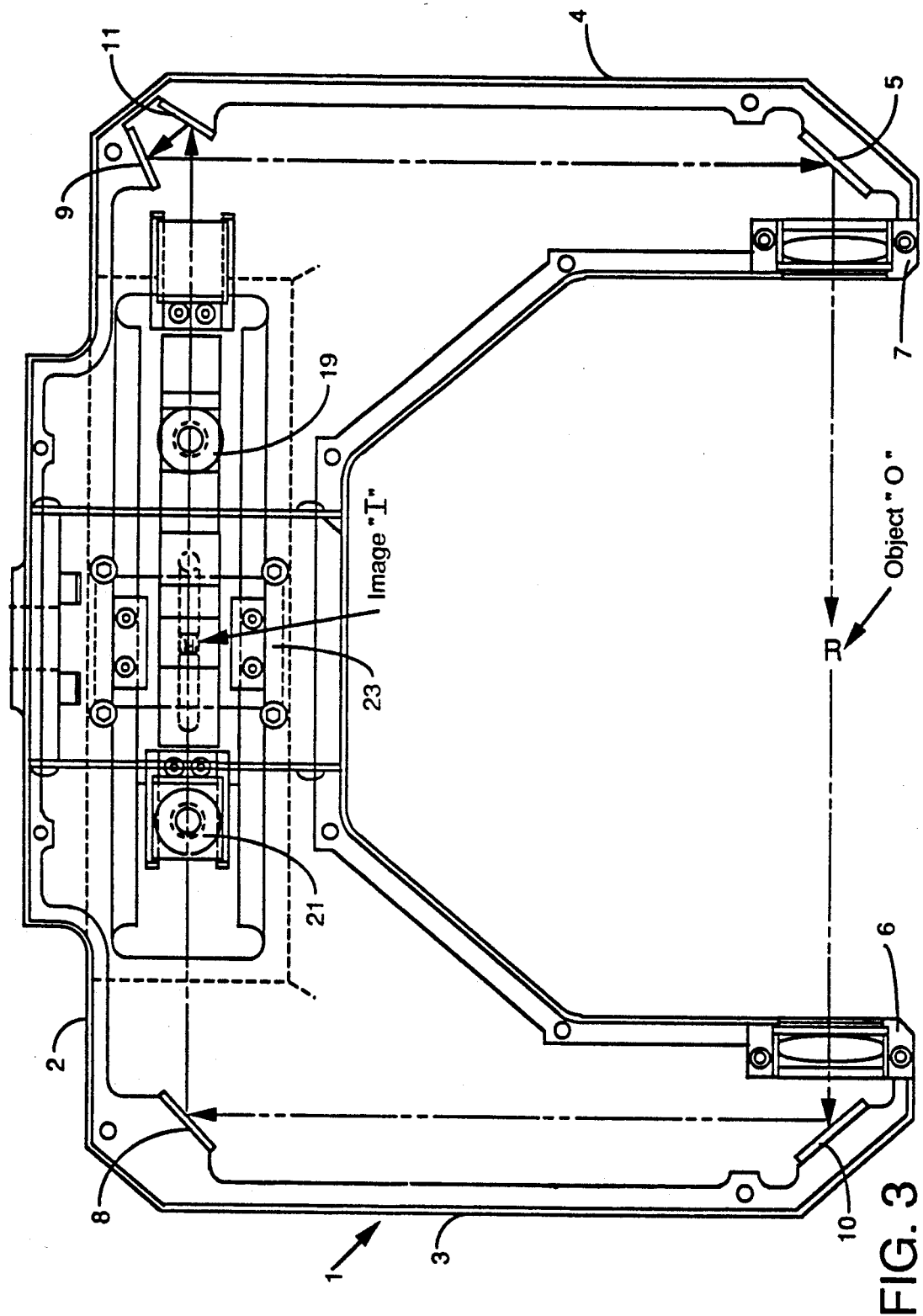
FIG. 3 is a top plan view of an optical yoke in accordance with the present invention in a right hand tool viewing position.
Figure 4:
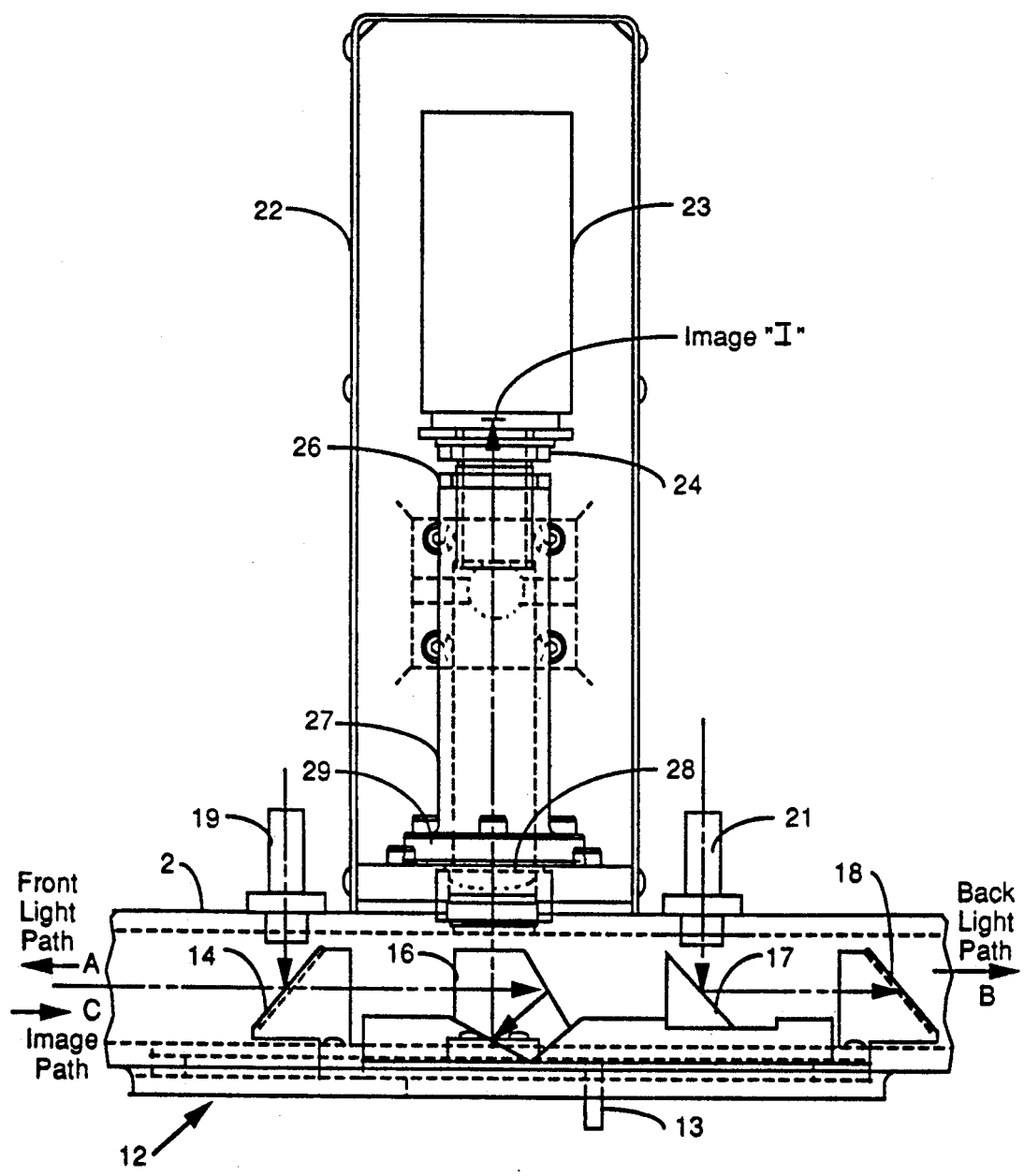
FIG. 4 is a front elevational view of the yoke of FIG. 3.

FIGS. 1 and 2 show the optical yoke in a left hand tool viewing position, whereas FIGS. 3 and 4, depicting the same apparatus with the same elements identified by the same numerals as FIGS. 1 and 2, shows the apparatus in a right hand tool viewing position.

In the different positions of FIGS. 2 and 4, the direction of the frontlight path is denoted by the letter "A," the direction of the backlight path is denoted by the letter "B," and the direction of the image path is denoted by the letter "C."

It is seen (FIGS. 1 and 3) that the primary objective lenses 6 and 7 are arranged 180° apart and are focussed on opposite sides of a target object "O" located centrally between these lenses. This permits viewing tools possessing left or right handedness, without bias. This arrangement of lenses, mirrors and prisms also permits viewing of a specimen or group of specimens through a single eyepiece (or camera) with multiple, selectable objective lens sets, so that multiple perspective views are possible.

As shown in the drawings, two alternative optical viewing paths are provided. These alternate paths are identified as left and right hand viewing. The provision of two available light sources permits front illumination in addition to backlighting (viewing of an object in silhouette) as is commonly done with prior art optical comparators. The arrangement of the invention thus provides four primary viewing modes: left hand viewing with backlight or front light source, and right hand viewing with backlight or front light source, as well as mixed illumination.

Selection of the primary objective lens elements to be used is accomplished by moving the optical elements placed in the light path between the objective lenses 6 or 7 and the eyepiece lens sets. In the embodiment shown in the FIGURES, this is done manually by moving selector slide 12 by means of knob 13. Switching also may be done by using a galvanometer-mounted optical element arrangement to permit automated selection of objective or interleaving of frames in which, for example, opposite sides of a two-dimensional object can be alternately viewed, or interval-timed images can be obtained showing movement of the object or scene viewed, e.g. in space-surveillance applications. Such an arrangement, in which views can be obtained from two or more viewpoints without the need for a moving camera, may be especially desirable for video camera data acquisition for digitizing and analysis. A typical example of interleaved frames would be edge-finding without strobe light sources.

The optical yoke system herein shown and described preferably uses an objective lens-to-target distance of one focal length. Since focal length is defined a the distance required for parallel light waves from an infinitely distant source to be focussed, it follows that the unerected image travels as an infinitely distant object, and the light path distances from either side of the optical yoke are not critical for imaging. In the backlighting or silhouette mode, the light focus is critical in order to minimize distortion. Here also the distance from the target object to the primary objective lens preferably is one focal length.

In use of the present invention as shown, the image of the target object is erected at actual size on the CCD array of the video camera. Magnification occurs during presentation of this information on an attached monitor. Degree of magnification or reduction can be provided by changing lenses and/or distance from the objective lens to the target object. Formulae for calculating such options are well known to those familiar with the art.

The arrangement of optical elements shown presents a frontal view through both light paths, with the object image focussed on the CCD array of the video camera. By rearranging the optical elements, it is possible to obtain an erect image through one light path and an inverted image through the other light path. Such an arrangement is appropriate for optical overlay applications.

I claim:

1. An optical projector comprising:
   a. a pair of first and second spaced-apart primary objective lenses opposed to each other by an angle of 180° and defining therebetween a portion of a first light path lying in a substantially horizontal plane and in which a target object to be viewed may be disposed in a position centrally between the primary objective lenses;
   b. eyepiece means comprising a secondary objective lens disposed above the plane of the first light path and a viewing element spaced above the secondary objective lens and defining therewith a second light path disposed in a substantially vertical direction;
   c. first and second light sources disposed above the plane of the first light path on either side of the target object and adapted to inject light into the first light path alternately in either direction along a length thereof;
   d. reflecting means disposable in the first light path to transmit a light beam from a light source and through the primary objective lenses to the target object and thence to the eyepiece secondary objective lens, and
   e. means to switch the reflecting means to change the direction of a light beam in the first light path from a first, left hand viewing direction to a second, right hand viewing direction whereby images of the target object are alternately provided in the first and second directions in the first light path and are presented by the reflecting means to the secondary objective in the second light path and by the secondary objective to the eyepiece viewing element.

2. A projector according to claim 1, wherein the eyepiece viewing element is a CCD array of a video camera.

3. An optical projector comprising:
   a. first and second primary objective lenses opposed to each other by an angle of 180° and defining therebetween a first portion of a first light path lying in a substantially horizontal plane, each primary objective lens being spaced equidistantly from a target object disposed in the first portion of the first light path between the opposed primary objective lenses;
   b. eyepiece means disposed above the plane of the first light path and comprising a single eyepiece secondary objective lens and, disposed thereabove, a single eyepiece viewing element, the secondary objective lens and the viewing element defining therebetween a second light path perpendicular to the plane of the first light path;
   c. first and second light sources disposed above the plane of the first light path, each light source serving as either a backlighting source or a front lighting source;
   d. reflecting means disposed in a second portion of the first light path to transmit a light beam from a light source through a first segment of the second portion of the first light path, through a first primary objective lens to the target object, from the target object through a second primary objective lens, through a second segment of the second portion of the first light path and thence to the eyepiece secondary objective lens, and
   e. means to switch the reflecting means from a left hand object viewing position to a right hand object viewing position thereby providing alternate light paths for viewing the target object by either backlighting or front lighting or by mixed illumination.

4. A projector according to claim 3, wherein the eyepiece viewing element is a video camera.

5. A projector according to claim 3, wherein the distance from the target object to each of the opposed primary objective lenses is approximately one focal length.

6. A projector according to claim 5, wherein the eyepiece viewing element is a CCD array of a video camera.

7. A projector according to claim 6, wherein an inverted image of the object viewed is projected onto the CCD array in which the image is re-erected.

8. A multi-axis optical projector for use in a tool resetting and measuring system to measure tool profile and to identify tool surface defects, comprising:
   a. a generally U-shaped yoke comprising a crosspiece and two dependent legs;
   b. first reflector means comprising reflecting surfaces mounted on the yoke respectively at intersections of the yoke crosspiece and the dependent legs and at the free ends of the two dependent legs;
   c. opposed primary objective lenses mounted respectively on the inside of a free end of each dependent leg and defining, with the first reflector means a first light path, each primary objective lens being located approximately equidistantly from a target tool disposable in the first light path between the primary objective lenses;
   d. a selector slide mounted for reciprocal linear movement on the yoke crosspiece;
   e. first and second light sources mounted on the yoke crosspiece, each such light source being adapted to serve as a source of backlighting or front lighting of a target tool to be viewed;
   f. a housing mounted on the yoke crosspiece above the first light path;
   g. a single eyepiece secondary objective lens mounted on the yoke crosspiece within the housing and adapted to focus a target tool image at a single eyepiece viewing element, the secondary objective and the viewing element defining therebetween a second light path substantially perpendicular to the first light path;
   h. second reflector means mounted on the selector slide and interposable in the first light path to provide a light path from a light source, along the first light path, to a target tool and from the target tool to the eyepiece secondary objective lens in the second light path; and
   i. means to shift the selector slide and the second reflector means mounted thereon from a left hand tool viewing position to a right hand tool viewing position, whereby the target tool may be viewed alternately in either a left hand tool viewing position or the right hand tool viewing position with either backlighting or front lighting, or with mixed illumination.

9. A projector according to claim 8, wherein the distance from each primary objective lens to a target tool disposable equidistantly between the lenses is approximately one focal length.

10. A projector according to claim 9, wherein the second reflector means includes a first and second beam splitter, a pentaprism and a mirror mounted on the selector slide for alternate reciprocable movement into a left hand tool viewing position wherein the pentaprism is under a first light source for backlighting and a first beam splitter is under a second light source for front lighting, and for movement into a right hand tool viewing position wherein the second beam splitter is under the first light source for front lighting and the mirror is under the second light source for backlighting, thereby providing alternate light paths for viewing a target tool either by backlighting for measurement of the tool or by front lighting for surface inspection of the tool.

11. A projector according to claim 10, wherein the eyepiece viewing element is a CCD array of a video camera.

12. A projector according to claim 10, wherein, in the left hand viewing position, a backlight path extends from the first, backlight source to the pentaprism, from the pentaprism to the first beam splitter, from the first beam splitter, through the first reflector means and the primary objective lenses to the second beam splitter, from the second beam splitter to the mirror mounted on the selector slide, from the slide-mounted mirror to the eyepiece secondary objective lens, and from the secondary objective lens to the eyepiece viewing element where an erected image is formed, and wherein a front light path extends from the second, front light source to the second beam splitter, from the second beam splitter through the first reflector means and the primary objective lenses to the second beam splitter, from the second beam splitter to the mirror mounted on the selector slide, from the slide-mounted mirror to the eyepiece secondary objective lens and from the eyepiece secondary objective lens to the eyepiece viewing element where an erected tool image is formed.

13. A projector according to claim 10, wherein, in the right hand viewing position, a backlight path extends from the second, back light source to the mirror mounted on the selector slide, from the slide-mounted mirror to the second beam splitter, from the second beam splitter through the first reflector means and the primary objective lenses to the first beam splitter, from the first beam splitter to the pentaprism mounted on the selector slide, from the pentaprism to the eyepiece secondary objective lens, and from the secondary objective lens to the eyepiece viewing element where an erected tool image is formed, and wherein a front light path extends from the first, front light source to the first beam splitter, from the first beam splitter through the first reflector means and the primary objective lenses and back to the first beam splitter, from the first beam splitter to the pentaprism mounted on the selector slide, from the pentaprism to the eyepiece secondary objective lens and from the eyepiece secondary objective lens to the eyepiece viewing element where an erected tool image is formed.

14. A method of viewing a target object in a multi-axis optical projector comprising two spaced-apart primary objective lenses between which the target object is disposed, a light source for each of the primary objective lenses, a single eyepiece means comprising a secondary objective lens and a single eyepiece viewing element comprising a camera provided with a CCD array upon which the secondary objective lens is focussed, reflector means providing light paths from the respective light sources to the target object and from the target object through a primary objective lens to the secondary objective lens, which method comprises injecting light alternately through a first light path from a first light source, through the primary objective lenses and from the reflector means to the secondary objective lens and a through a second light path from a second light source through the primary objective lens and from the reflector means to the secondary objective lens whereby the target object is viewed at the CCD array of the camera from multiple perspectives without the need for a moving camera.

15. A method according to claim 14, wherein the eyepiece viewing element is a video camera.

16. A method according to claim 15, wherein an inverted target object image is presented to the camera which re-erects the image.

17. A method of measuring and surface inspecting a target object, comprising:
- disposing the target object between a pair of primary objective lenses;
- alternately backlighting and front lighting the target object;
- transmitting the back light and front light through a secondary objective lens to a single eyepiece, and
- measuring the target object by means of the transmitted back light and inspecting the surface of the target object by means of the front light.

18. A method according to claim 17, wherein the distance from the target object to each primary objective lens is approximately one focal length when the target object is viewed either by backlighting or by front lighting.

19. A method according to claim 18, wherein a video camera is used as the eyepiece, an inverted image is presented to the camera, and the inverted image is re-erected by the camera.

20. A method according to claim 19, wherein a right handed tool is viewed through a first primary objective lens and a related light path and a left handed tool is viewed through a second primary objective lens and a related light path.

21. A method according to claim 20, wherein the target object is a tool possessing handedness and which tool is measured by backlighting for presetting of both right handed and left handed tools without handedness bias.

* * * * *